Aug. 2, 1949.　　　　G. H. SITTNER　　　　2,478,018
APPARATUS FOR CONTINUOUSLY SHEATHING
CORES OF MATERIAL
Filed Oct. 29, 1946
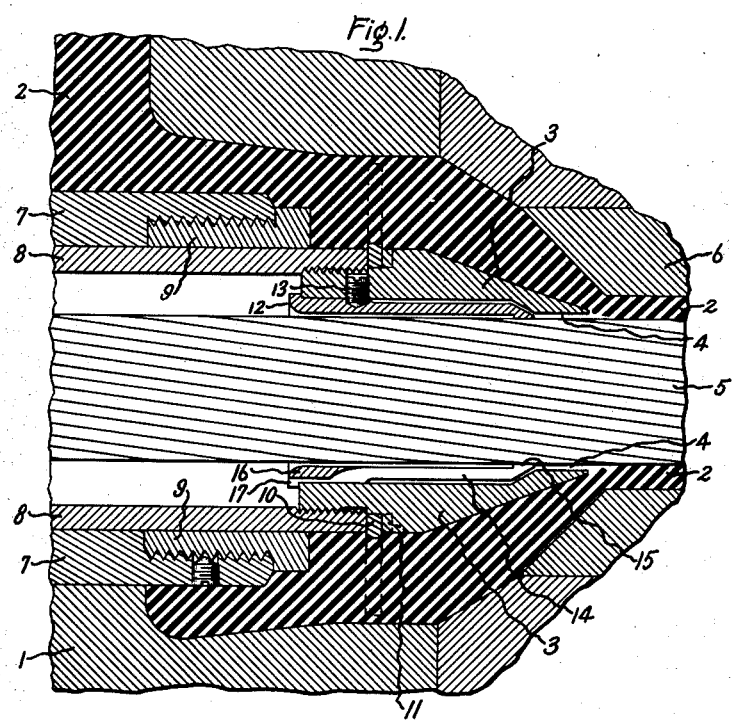
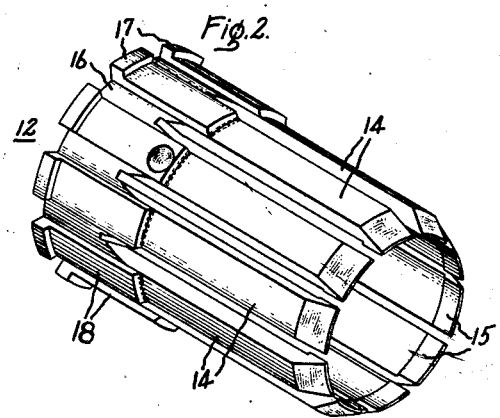
Inventor:
George H. Sittner,
by Ernest C. Britton
His Attorney.

Patented Aug. 2, 1949

2,478,018

UNITED STATES PATENT OFFICE 2,478,018

APPARATUS FOR CONTINUOUSLY SHEATHING CORES OF MATERIAL

George H. Sittner, Schenectady, N. Y., assignor to General Electric Company, a corporation of New York Application October 29, 1946, Serial No. 706,357

8 Claims. (Cl. 18—13)

My invention relates to apparatus for continuously sheathing cores of material and more particularly to apparatus for extruding a sheath or jacket upon wires, cables and the like, and especially my invention relates to improvements in sheathing apparatus of the type disclosed in my copending application, Serial No. 619,174, filed September 28, 1945 which has become Patent 2,427,930 and assigned to the assignee of this invention.

The extrusion method of applying particularly an insulated sheath or jacket to wires or cables has been in use for many years. Such machines, an example of which is disclosed in United States Letters Patent 1,770,985, are often referred to as tubing machines. Usually these machines comprise a hopper into which the thermoplastic or thermosetting material to be extruded is fed. The material is heated to an extrudable condition in the machine which is provided with a conveying screw for forcing the extrudable material under high pressure into the extrusion head. This head comprises a die for causing this material to surround the core of wire, cable, etc. to form a sheath or jacket thereon.

As disclosed in my copending application, the leader through which the core passes into the die and over which the extrudable material is led to come between the core and the die has a continuous outer leading surface in order to insure the desired movement of the material. In consequence of this requirement, the exit opening of the leader is fixed in shape and size. This is all right as long as the cross section of the core is substantially the same shape and size as the exit opening. Manufacturing tolerances, however, are such that while the shape of the core is maintained substantially fixed, the size varies materially. Assuming a core of circular cross section, for example, I have found that variations in core diameter of at least as much as 50 mils. (0.05") are to be expected. This variation is too much to squeeze the core down to size in a leader having a fixed exit opening with a diameter substantially equal to the minimum diameter of the core. On the other hand, if the diameter of the exit opening of the leader is made large enough to accommodate the maximum variation in diameter of the core to be expected, then the portions of the core of minimum diameter will not be centered in the passage of the core through the die. In consequence of this, the sheath or jacket of extruded material is eccentrically deposited on the core. In other words, because of the eccentricity of the core relatively to the die, the sheath is not uniform in thickness. This is undesirable because the insulating material is not used to the best advantage and also because thin spots are likely to occur and lead to eventual breakdown.

An object of my invention is to provide improved sheathing apparatus such that, regardless of manufacturing tolerances in the size of the core within predetermined limits, the thickness of the sheath applied to the core is maintained uniform within such limits. Another object of my invention is to provide improved sheathing apparatus wherein the core is maintained centrally disposed relatively to the opening in the die. A further object of my invention is to provide improved sheathing apparatus such that no material deformation, squeezing, scraping and the like of the core occur as it passes through the guideway into the die. These and other objects of my invention will appear in more detail hereinafter.

In accordance with my invention, I provide means for so guiding the core through the die as to insure a uniform distribution of the extruded material over the periphery of the core whereby to maintain the thickness of the sheath nearly constant throughout the length of the core. Furthermore, in accordance with my invention, I provide a guider which adapts itself to tolerance variations in the size of the core so as to maintain the core centered relatively to the disk as the core passes through the guideway into the die. Still further in accordance with my invention, I provide a guider which is so adapted to tolerance variations in the size of the core as to produce negligible deformation, scraping and scratching of the core as it passes through the guideway. Again in accordance with my invention, I provide the leader with an exit opening at least as large as the maximum size of the core. Also in accordance with my invention, I provide a tubular resilient guide which is centrally mounted in the leader and has an exit opening at least as small as the smallest size of the core.

My invention will be better understood from the following description when considered in connection with the accompanying sheet of drawings, and its scope will be pointed out in the appended claims.

In the accompanying sheet of drawings, Fig. 1 is a longitudinal sectional view of sheathing apparatus embodying my invention; and Fig. 2 is a view in perspective of a guide embodying my invention in a form specifically adapted for the apparatus shown in Fig. 1.

Referring now to Fig. 1 of the drawing, I have illustrated therein in longitudinal cross section only so much of the tubing machine extruding apparatus disclosed in my copending application, supra, as is necessary to an understanding of my present invention. The illustrated apparatus comprises an extrusion head 1, and the tubing machine itself may be of any well-known construction. Since a complete description of the tubing machine is unnecessary to an understanding of my invention, it is sufficient to state that the tubing machine is provided with a conveyor screw which forces the extrudable material, generally indicated at 2 and illustrated as insulating material, through a chamber, not shown, into the extrusion head 1 which is suitably supported. In the illustrated embodiment of my invention, the flow of extrudable material 2 is at right angles to the axis of the extrusion head 1 and then diverted to flow in the direction of the axis of the extrusion head. The material to be extruded, which may comprise a thermosetting or thermoplastic material, may be supplied to the tubing machine as cold granular stock in one extreme or in hot milled stock in the other extreme. When the extrudable material 2 reaches the extrusion head 1, it is in a hot plastic condition.

The extrusion head 1 also includes a tubular leader 3 which is provided with an opening 4 through which a core 5, such as a cable or wire, may be moved during the jacketing or sheathing operation. This opening 4 is centered with the opening in a suitably supported die 6 and, in accordance with my invention, is made at least as large in size and corresponding in shape to the largest cross-sectional area of the core to be expected in consequence of manufacturing tolerances. The leader 3 is so positioned that the hot compound or extrudable material 2 may flow around the leader to encircle the core 5 to be sheathed or jacketed. The leader 3 is preferably capable of movement along the axis of the wire or cable 5 whereby the rate of flow of the extrudable material may be controlled. In order to effect such longitudinal movement of the leader 3, a longitudinally adjustable sleeve 7 is provided within the extrusion head 1. This sleeve is mounted in the extrusion head 1 and is prevented from rotating relatively thereto by means of a suitable key, not shown. Longitudinal movement of the sleeve 7 may be obtained by suitable means, not shown.

In the illustrated embodiment of my invention, the leader 3 is mounted on a rotatable member such as a tubular shaft 8 journaled at one end in a suitable bearing such as a bushing 9 mounted in the end of the sleeve 7. The other end of the hollow shaft 8 may be rotatably supported in any suitable manner as will be obvious to those skilled in the art. Also the shaft 8 is arranged to be rotated by any suitable means, examples of which are well known in the art.

In order to avoid dead or cold spots in the extrudable material as pointed out in my copending application, supra, there is provided an agitator 10 in the form of a radially slotted annular disk which is keyed to the leader 3 by one or more integral lugs 11 so as to turn with the leader. This agitator substantially fills the annular space around the leader 3 through which the extrudable material must be passed during the tubing operation. I have found that very satisfactory operation can be obtained by rotating the tubular shaft 8 and consequently the agitator 10 at a relatively slow speed, for example approximately 6 R. P. M., whereby the extrudable material is constantly agitated as it is forced onto the cable 5 in its passage over the leader 3 prior to being sized while passing through the die 6.

I have found that in consequence of manufacturing tolerances the size of the cross-sectional area of the core 5 varies materially although its shape is maintained substantially fixed. It is therefore unsatisfactory to try to move the core through the leader 3 whose exit opening is the same as the nominal size of the core. When it is attempted to do this, the oversized portions of the core are squeezed, deformed and injured, which of itself is unsatisfactory. Also, when undersized portions of the core come along, the core is no longer centered relatively to the opening in the die 6. In consequence of this, the sheathing layer is eccentrically deposited on the core, which is not only unsatisfactory from the manufacturing standpoint but also results in thin spots subject to breakdown of insulation.

In order to avoid these difficulties, I provide in accordance with my invention yieldable means centrally disposed within the leader 3 for centering the core 5 relatively to the die 6 during movement of the core through the leader. As illustrated in Figs. 1 and 2, this means comprises a guide 12 which is centrally mounted within the leader 3 so as to rotate therewith. One or more set screws 13 may be used to lock the leader 3 and the guide 12 against relative rotation. Further in accordance with my invention, the guide 12 is provided with a plurality of resilient longitudinal elements or fingers 14. The forward or free ends of these fingers are furnished on the interior with lands 15 to provide in the illustrated embodiment of my invention a circular opening, the static diameter of which is at least as small as the smallest diameter of the cable to be expected within the manufacturing tolerance limits. These lands, because of their relatively small area of contact, induce yielding or bending of the fingers 14 at the exit point whenever the size of the core exceeds the predetermined minimum limit. The fingers 14 may be made by slotting a cylindrical steel member, the rear or body portion of which forms a skirt 16 which is provided with lugs 17 to prevent forward longitudinal movement of the guide 12 relatively to the leader 3. The guide 12 is suitably tempered so that the fingers 14 are expansible or yield sufficiently freely to variations in the diameter of the cable 5 to permit passage therethrough of the portions of diameter not exceeding the maximum limit and yet to guide the core 5 sufficiently to maintain it centered relatively to the opening in the die 6 when portions of the cable of the minimum limit diameter pass through. Also the resiliency of the fingers 14 and the guide 12 is such as not to result in deformation or material marring of the core 5 as it passes through the opening defined by the lands 15 on the fingers 14. The skirt 16 also includes raised portions, such as lands 18 shaped to an overall diameter which provides a snug fit in the rear end of the leader 3.

When it is desired to inspect the applied insulation or to take a sample of plastic material from the core, the machine is stopped for a brief interval approximating, for example, a quarter of a minute. Even though the supply of extrudable material is cut off during this interval, there is a tendency for the material in the head and its associated parts to work backward through the space between the leader 3 and the core 5 into the spaces between the leader and the outer surface of the resilient fingers 14, between these fingers, and also between the inner surface of the fingers and the core 5. In order to prevent accumulations of such back flowing material from collecting and interfering with the correct operation of the guide 12, the sides of the fingers 14 are flared outwardly as shown in Fig. 2 to form an easy flowing channel, the sides of which taper into the skirt 16. This formation provides, through the notches formed by the skirt 16 and the lands 18 thereon, a smooth flow channel which will not become choked with the backward flowing extrudable material since the material is thus free to move into the open space between the core 5 and the hollow shaft 8 so as to escape from the open rear end of the shaft.

While I have shown and described by invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In apparatus for producing a sheath of extrudable material on a core having a transverse section of substantially fixed shape but subject to variation in size within predetermined limits, a die for forming the sheath on said core as the core is moved through the opening in the die, a leader for guiding said core into said die, said leader having an outgoing opening centered with the opening in said die and of a shape corresponding to the shape of the section of the core and of a size at least as large as the larger of said limits, yieldable means centrally disposed within said leader for centering the core relatively to the die during movement of the core through the leader and means comprising channels between said leader and said yieldable means to provide for escape of such of said extrudable material as works backwardly through the space between the core and the exit portion of said yieldable means.

2. In apparatus for producing a sheath of extrudable material on a core having a transverse section of substantially fixed shape but subject to variation in size within predetermined limits, a die for forming the sheath on said core as the core is moved through the opening in the die, a rotatable leader for guiding said core into said die, said leader having an outgoing opening centered with the opening in said die and of a shape corresponding to the shape of the section of the core and of a size at least as large as the larger of said limits, means for centering said core relatively to said die during movement of the core through said leader comprising a guide centrally mounted in said leader and rotatable therewith, the exit end of said guide being yieldable and of a shape corresponding to the shape of the section of the core and of a static size at least as small as the smaller of said limits and means comprising channels between said leader and said guide to provide for escape of such of said extrudable material as works backwardly through the space between the core and the exit portion of said guide.

3. In apparatus for producing a sheath of extrudable material on a core having a transverse section with a substantially circular periphery subject to variation in diameter within predetermined limits, a die for forming the sheath on said core as the core is moved through the opening in the die, a leader for guiding said core and said material into said die, said leader having an outgoing circular opening centered with the opening in the die and at least as large in diameter as the larger of said limits, and means for centering said core relatively to said die during movement of the core through said leader comprising a tubular guide having a plurality of spaced resilient fingers, the free ends of said fingers having internal lands adjacent the exit end of the leader in the form of a circle with a static diameter at least as small as the smaller of said limits but expansible by said core to at least the greater of said limits as the core is moved through the guide and leader into the die.

4. In apparatus for producing a sheath of extrudable material on a core having a transverse section with a substantially circular periphery subject to variation in diameter within predetermined limits, a die for forming the sheath on said core as the core is moved through the opening in the die, a leader for guiding said core and said material into said die, said leader having an outgoing circular opening centered with the opening in the die and at least as large in diameter as the larger of said limits, and means for centering said core relatively to said die during movement of the core through said leader comprising a guide centrally mounted in said leader, said guide having a body portion and a plurality of yieldable fingers extending therefrom, the free ends of said fingers having internal lands adjacent the exit end of said guide and arranged in cylindrical form with a static diameter at least as small as the smaller of said limits but expansible by said core to at least the greater of said limits as the core is moved through the guide and leader into the die.

5. In apparatus for producing a sheath of extrudable material on a core having a transverse section of substantially fixed shape but subject to variation in size within predetermined limits, a die for forming the sheath of said core as the core is moved through the opening in the die, a rotatable leader for guiding said core into said die, said leader having an outgoing opening centered with the opening in said die and of a shape corresponding to the shape of the section of the core and of a size at least as large as the larger of said limits, means for centering said core relatively to said die during movement of the core through said leader comprising a tubular steel guide centrally mounted in said leader, said guide having a body portion provided with a plurality of yieldable fingers with their free ends arranged to correspond to the shape of the section of the core and of a static size at least as small as the smaller of said limits but expansible by said core to at least the greater of said limits as the core is moved through the guide and leader into the die, and means for preventing rotary and translatory movements of said guide relatively to said leader.

6. In apparatus for producing a sheath of extrudable material on a core having a transverse section with a substantially circular periphery subject to variation in diameter within predetermined limits, a die for forming the sheath on said core as the core is moved through the opening in the die, a substantially rigid rotatable tubular leader for guiding said core and said material into said die, said leader having an outgoing circular opening centered with the opening in the die and at least as large in diameter as the larger of said limits, and means for centering said core relatively to said die during movement of the core through said leader comprising a tubular guide mounted within said leader for rotation therewith and having a body portion and a plurality of spaced resilient fingers extending therefrom with their free ends adjacent the exit end of the leader in the form of a circle with a static diameter at least as small as the smaller of said limits but expansible by said core to at least the greater of said limits as the core is moved through the guide and leader into the die.

7. In apparatus for producing a sheath of extrudable material on a core having a transverse section of substantially fixed shape but subject to variation in size within predetermined limits, a die for forming the sheath on said core as the core is moved through the opening in the die, a leader for guiding said core into said die, said leader having an outgoing opening centered with the opening in said die and of a shape corresponding to the shape of the section of the core and of a size at least as large as the larger of said limits, and means for centering said core relatively to said die during movement of the core through said leader comprising a guide having a skirt portion and a plurality of spaced resilient fingers extending therefrom adjacent the exit end of the leader with an internal form corresponding to the shape of said core, the inner surfaces of the free ends of said fingers forming an opening at least as small as the smaller of said limits but expansible by said core to at least the greater of said limits as the core is moved through the guide and leader into the die and the skirt portion of said guide being provided with notches in alignment with the spaces between said fingers and the sides of said fingers being flared outwardly and tapered into said notches to provide an escape channel for such of said extrudable material as works backwardly through the space between the core and the exit portion of said guide, and means for preventing movement of the skirt portion of said guide relatively to said leader.

8. In apparatus for producing a sheath of extrudable material on a core having a transverse section of substantially fixed shape but subject to variation in size within predetermined limits, a die for forming the sheath on said core as the core is moved through the opening in the die, a rotatable leader for guiding said core into said die, said leader having an outgoing opening centered with the opening in said die and of a shape corresponding to the shape of the section of the core and of a size at least as large as the larger of said limits, and means for centering said core relatively to said die during movement of the core through said leader comprising a guide having a skirt portion and a plurality of spaced resilient fingers extending therefrom, the free ends of said fingers having internal lands adjacent the exit end of the leader with an internal form corresponding to the shape of said core and an opening at least as small as the smaller of said limits but expansible by said core to at least the greater of said limits as the core is moved through the guide and leader into the die, the skirt portion of said guide being provided with notches in alignment with the spaces between said fingers and the sides of said fingers being flared outwardly and tapered into said notches to provide an escape channel for such of said extrudable material as works backwardly through the space between the core and the exit portion of said guide, and means for preventing both rotary and translatory movements of said guide relatively to said leader.

GEORGE H. SITTNER.

REFERENCES CITED

The following references are of record in the file of this patent:

UNITED STATES PATENTS

| Number | Name | Date |
| --- | --- | --- |
| 1,294,008 | Will | Feb. 11, 1919 |
| 1,689,312 | Williams | Oct. 20, 1928 |
| 2,213,481 | Alder | Sept. 3, 1940 |
| 2,340,808 | Gruetjen | Feb. 1, 1944 |
| 2,366,528 | Heath | Jan. 2, 1945 |